US007499918B2

(12) United States Patent
Ogikubo

(10) Patent No.: US 7,499,918 B2
(45) Date of Patent: Mar. 3, 2009

(54) INFORMATION PROCESSING APPARATUS AND METHOD, PROGRAM, AND RECORDING MEDIUM

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 11/131,372

(22) Filed: May 18, 2005

(65) Prior Publication Data

US 2005/0278618 A1 Dec. 15, 2005

(30) Foreign Application Priority Data

May 25, 2004 (JP) ............................ 2004-155220

(51) Int. Cl.
*G06F 17/30* (2006.01)

(52) U.S. Cl. ................ 707/3; 707/1; 707/10; 707/100; 707/104.1; 382/276

(58) Field of Classification Search ................ 707/1-3, 707/6, 10, 100, 104.1; 382/276
See application file for complete search history.

(56) References Cited

U.S. PATENT DOCUMENTS

| | | | | |
|---|---|---|---|---|
| 5,493,677 | A * | 2/1996 | Balogh et al. | 707/104.1 |
| 2004/0057697 | A1 * | 3/2004 | Renzi et al. | 386/83 |
| 2004/0085342 | A1 * | 5/2004 | Williams et al. | 345/723 |
| 2005/0165795 | A1 * | 7/2005 | Myka et al. | 707/100 |

FOREIGN PATENT DOCUMENTS

| | | |
|---|---|---|
| JP | 04-294694 | 10/1992 |
| JP | 05-048964 | 2/1993 |
| JP | 2002-027396 | 1/2002 |
| JP | 2002-344789 | 11/2002 |
| JP | 2003-174615 | 6/2003 |

* cited by examiner

*Primary Examiner*—Cam-Linh Nguyen
(74) *Attorney, Agent, or Firm*—Oblon, Spivak, McClelland, Maier & Neustadt, P.C.

(57) ABSTRACT

An information processing apparatus for processing content data obtained from a plurality of capturing devices by capturing an object includes a storing device, an obtaining device, and a searching device. The storing device stores additional information in association with the content data. The additional information includes address information for linking the content data obtained from the plurality of capturing devices that are grouped. The obtaining device obtains the additional information stored by the storing device. When content data corresponding to a specified capturing device in the plurality of capturing devices is read from the storing device, the searching device automatically searches for the content data to be linked to the read content data.

18 Claims, 14 Drawing Sheets

RT1 START SP0
SET MULTI-CAMERA FLAG USING MENU VIEW SP1
SP2 MASTER CAMERA?
YES / NO
SP3 WRITE SLAVE CAMERA NO AND ID TO METADATA
SP5 WRITE MASTER CAMERA ID TO METADATA
SP6 SHARE TIME CODE BASED ON MASTER CAMERA
END SP4

3
20
20A
INTERFACE
20B
DATABASE
21
COMMAND PROCESSOR
22
MULTIPLEXER/ DEMULTI-PLEXER
23
ADDRESS PROCESSOR
24
DATA CONVERSION PROCESSOR
25
METADATA PROCESSOR
26
VIDEO STORAGE UNIT
27
AUDIO STORAGE UNIT
28
METADATA STORAGE UNIT
DATA
COMMAND
ADDRESS
ID
S1A~S1C
S2
S3

8
31
MOUSE
39
KEYBOARD
40
RAM
43
ROM
42
I/F
46
I/F
47
48
DISPLAY PROCESSOR
44
TITLE/GRAPHICS GENERATOR
45
CPU
41
HARD DISK DEVICE
30
DISK CONTROLLER
36
DISPLAY UNIT
38
VIDEO SPECIAL EFFECT PROCESSOR
34
37
AUDIO INPUT/OUTPUT MIXER UNIT
35
C1
SYSTEM CONTROLLER
32
S5
AUDIO/VIDEO INPUT/OUTPUT UNIT
33
S3

82
82E
80
81
81B
81C
81A
81D
OB
MA
MB
MC

INFORMATION PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2004-155220 filed in the Japanese Patent Office on May 25, 2004, the entire contents of which are incorporated herein by reference.

BACKGROUND OF THE INVENTION

1. Field of the Invention

The present invention relates to an information processing apparatus and method, a program, and a recording medium suitable for, for example, server systems in television broadcast stations.

2. Description of the Related Art

In broadcast station server systems, typically, audio and video captured by a plurality of video cameras are broadcasted in real-time, e.g., live, simultaneously or in a sequentially switched manner at desired times, and the captured audio and video are stored and managed on a video camera basis by a server.

In a server system, audio and video captured by each video camera can also be modified and edited in a desired manner using an editing device. The edited audio and video are registered as broadcast clips (audio-visual material) in a server so that the clips registered in the server can be read and broadcasted at desired times (see, for example, Japanese Unexamined Patent Application Publication No. 2000-32321).

SUMMARY OF THE INVENTION

In such a server system, when the server manages audio and video captured by a plurality of video cameras, it is necessary for an operator to consciously identify the storage file in which the captured audio and video are stored, the file name, the recording time, etc., on a video camera basis, which is time-consuming.

It is therefore desirable to provide an information processing apparatus and method, a program, and a recording medium with improved operator efficiency.

An information processing apparatus according to an embodiment of the present invention for processing content data obtained from a plurality of capturing means by capturing an object includes the following elements. Storing means stores additional information in association with the content data. The additional information includes address information for linking the content data obtained from the plurality of capturing means that are grouped. Obtaining means obtains the additional information stored by the storing means. When content data corresponding to a specified capturing means in the plurality of capturing means is read from the storing means, searching means automatically searches for the content data to be linked to the read content data. Therefore, once content data obtained by a certain capturing device is read, the content data recorded by the other capturing devices at the same time as the read content data can easily be identified, thus improving the operator efficiency.

An information processing method according to an embodiment of the present invention for processing content data obtained from a plurality of capturing means by capturing an object includes the steps of storing additional information in association with the content data, the additional information including address information for linking the content data obtained from the plurality of capturing means that are grouped, obtaining the additional information stored by the step of storing, and, when content data corresponding to a specified capturing means in the plurality of capturing means is read, automatically searching for the content data to be linked to the read content data. Therefore, once content data obtained by a certain capturing device is read, the content data recorded by the other capturing devices at the same time as the read content data can easily be identified, thus improving the operator efficiency.

An information processing apparatus according to an embodiment of the present invention for processing content data obtained from a plurality of capturing means by capturing an object includes the following elements. Obtaining means obtains additional information including address information for linking the content data obtained from the capturing means that are grouped. When content data corresponding to specified capturing means in the plurality of capturing means is specified, searching means automatically searches for the content data to be linked to the specified content data based on the additional information obtained by the obtaining means. Display control means displays the content data in a linked manner using the additional information obtained by the obtaining means and the content data searched for by the searching means. Therefore, once content data obtained by a certain capturing device is specified, the content data recorded by the other capturing devices at the same time as the specified content data can easily be displayed in a linked manner, thus improving the operator efficiency.

DESCRIPTION OF THE PREFERRED EMBODIMENTS

An embodiment of the present invention will be described in detail with reference to the drawings.

Figure 1:
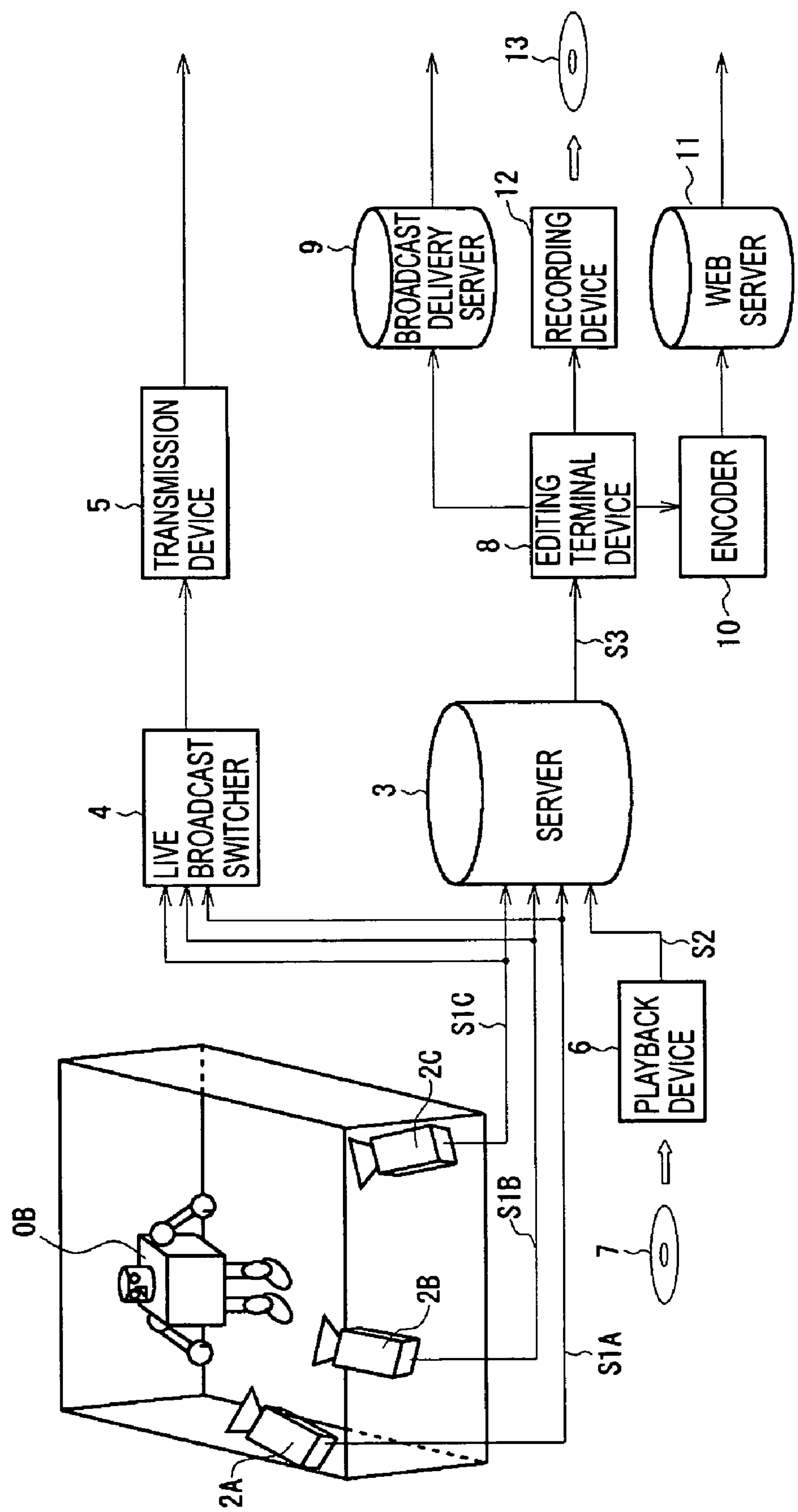
FIG. 1 is a block diagram of a server system according to an embodiment of the present invention.

FIG. 1 shows the overall structure of a server system 1 according to an embodiment of the present invention to be installed in a location, such as a television broadcast station or an outside broadcast vehicle for live broadcasting. The server system 1 includes a plurality of video cameras 2A to 2C surrounding an object OB, and a server 3 storing and managing audio and video captured by the video cameras 2A to 2C so that the audio and video captured by the video cameras 2A to 2C can be broadcasted in real-time or after the captured audio and video are edited and modified using the server 3.

In the server system 1, the server 3 and a live-broadcast switcher 4 are connected in parallel in the stage following the plurality of video cameras 2A to 2C. The audio and video captured by the video cameras 2A to 2C are broadcasted in real-time from a transmission device 5 via the live broadcast switcher 4 simultaneously or in a sequentially switched manner at desired times, and the captured audio and video are stored and managed on a video camera basis by the server 3.

The video cameras 2A to 2C are placed as desired around the object OB. For example, the video camera 2A is set as a positional reference video camera (hereinafter referred to as a "master camera") by, for example, turning on a flag, and the remaining video cameras (hereinafter referred to as "slave cameras") 2B and 2C are set by, for example, turning off flags so as to be dependent on the master camera 2A in terms of the positional relationship, time management, etc.

The master camera 2A sends data (hereinafter referred to as content data) S1A produced by adding metadata to audio and video data of the object OB captured by the master camera 2A to the server 3. The metadata includes position information indicating the latitude, longitude, and altitude of a current position of the master camera 2A, and time information indicating a time code representing the capturing time.

The slave cameras 2B and 2C send content data S1B and S1C to the server 3. The content data S1B and S1C are produced by adding metadata including, for example, position information indicating the latitude, longitude, and altitude of a current position of the slave cameras 2B and 2C and time information indicating time codes synchronized in time with the time code of the master camera 2A to the audio and video data of the object OB captured by the slave cameras 2B and 2C.

The slave cameras 2B and 2C record the position information and the time information in the form of absolute values without converting them into relative values during capturing. The time information is necessary for converting the content data S1B and S1C into NTSC (National Television System Committee) video composite signals so that the phase of color carrier signals of the NTSC video composite signals can also be synchronized in time with the master camera 2A. The position information is converted into relative values after it is uploaded to the server system 1.

Each of the master camera 2A and the slave cameras 2B and 2C includes a built-in position detector (not shown) using the global positioning system (GPS) for detecting the current position based on positioning radio waves received via an antenna (not shown) from satellites to generate position information indicating the current position.

The server 3 is connected not only to the master camera 2A and the slave cameras 2B and 2C but also to a playback device 6 for playing back media. The playback device 6 supplies content data S2 corresponding to recordings obtained by playing back a recording medium 7, e.g., a video tape, to the server 3.

The server 3 stores the content data S1A to S1C supplied from the video cameras 2A to 2C and the content data S2 supplied from the playback device 6 as content files. The server 3 selectively reads a specified content file of the content data S1A to S1C and S2, if necessary, and supplies it to an editing terminal device 8.

The editing terminal device 8 edits the audio and video data in the content data S1A to S1C and S2 supplied from the server 3 according to editing settings for audio and video, and transmits the edited content data S3 by a transmission method selected by an operator from television broadcasting, network distribution, or recording onto media.

When television broadcasting is selected, the editing terminal device 8 converts the edited content data S3 into a broadcast format and transmits the television broadcast via a broadcast distribution server 9. When network distribution is selected, the editing terminal device 8 encodes the edited content data S3 using an encoder 10 into web content for web streaming, and distributes the web content via a network, such as the Internet, while storing the web content in a web server 11 in the following stage. When recording onto media is selected, the editing terminal device 8 transmits the edited content data S3 to a recording device 12. The recording device 12 records the edited content data S3 onto a recording medium 13 loaded therein to produce a packaged medium.

In the server system 1, therefore, the content data S1A to S1C and S2 output from the video cameras 2A to 2C and the playback device 6 are transmitted via television broadcasting, and are also stored in the server 3 and read at desired times for appropriate editing. The edited content data is transmitted by a transmission method selected from television broadcasting, network distribution, and recording onto media.

Figure 2:
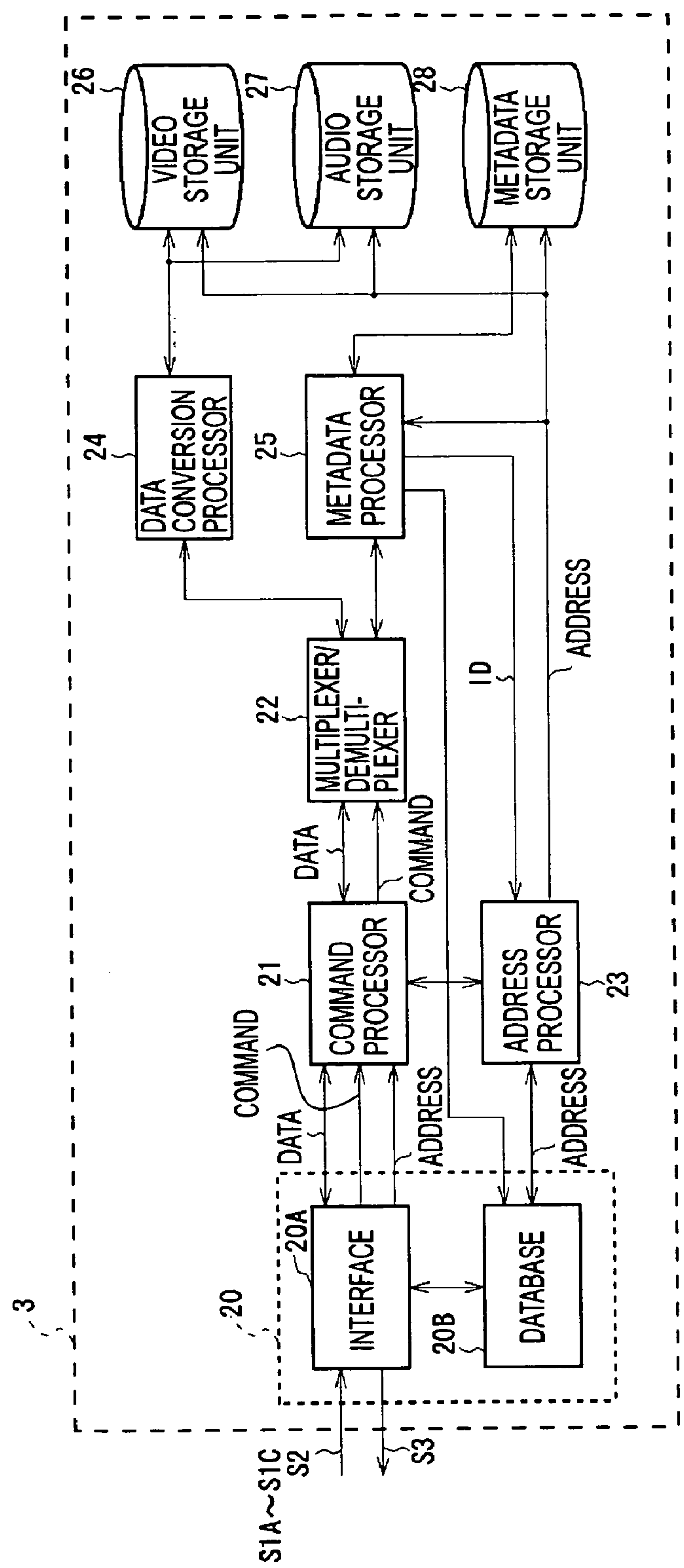
FIG. 2 is a block diagram of a server shown in FIG. 1.

FIG. 2 shows the internal structure of the server 3. In the server 3 shown in FIG. 2, when the content data S1A to S1C and S2 from the plurality of video cameras 2A to 2C and the playback device 6 (see FIG. 1) are received by a command processor 21 via an interface 20A in an input unit 20, the command processor 21 transmits the received data to a multiplexer/demultiplexer 22 after performing command processes. The command processor 21 further extracts an address that is allocated to the audio-visual material when the audio-visual material is recorded by the video cameras 2A to 2C based on the content data S1A to S1C, and transmits the extracted address to an address processor 23.

The multiplexer/demultiplexer 22 demultiplexes the content data S1A to S1C into video data, audio data, and metadata, and transmits the video data and the audio data to a data conversion processor 24 and the metadata to a metadata processor 25.

The data conversion processor 24 converts the video data demultiplexed by the multiplexer/demultiplexer 22 into a predetermined format, and then stores it in a video storage unit 26. The data conversion processor 24 also converts the demultiplexed audio data into a predetermined level of frequency, and then stores it in an audio storage unit 27.

The metadata processor 25 receives the metadata demultiplexed by the multiplexer/demultiplexer 22, and identifies the relative positional relationship of the video cameras 2A to 2C with respect to the object OB and the time codes of the slave cameras 2B and 2C synchronized with the time code of the master camera 2A.

Specifically, the metadata includes, for example, proxy data representing thumbnail images, coordinate data indicating the position information obtained using GPS, frame-based data including a time code and a good shot mark added by an operator during capturing, and file-based data constituted by a file system described below.

A database 20B in the input unit 20 stores metadata files (hereinafter referred to as a "file system") as an index table. In the file system, the metadata supplied from the metadata processor 25 is converted into a file format based on a unique material identifier (UMID) registered during capturing, which is unique to each of the video cameras 2A to 2C.

Figure 3:
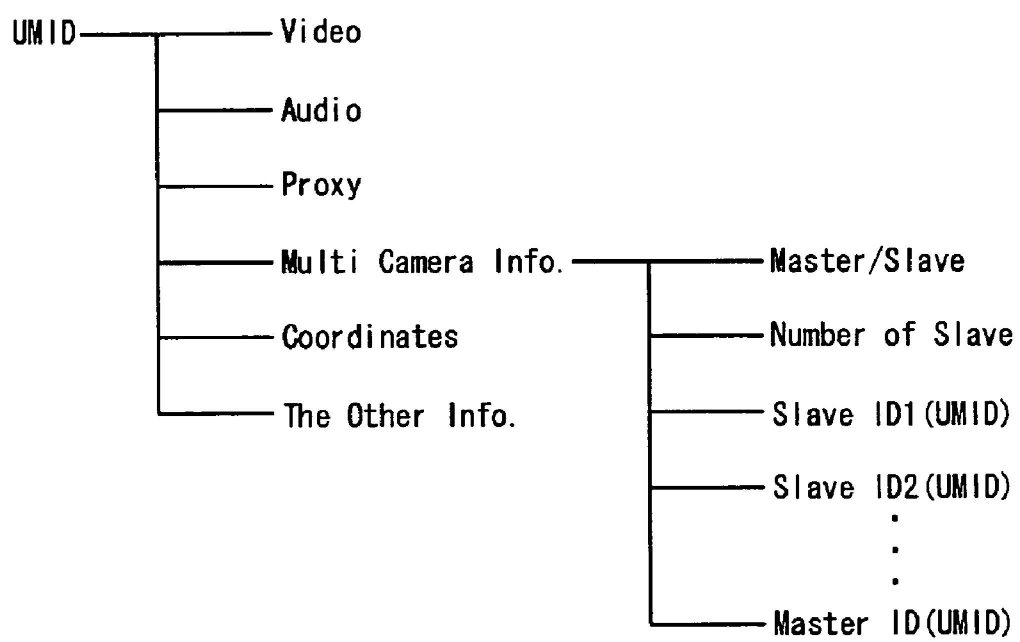
FIG. 3 is a schematic diagram of a file system of the server.

As shown in FIG. 3, the UMID includes, in a lower layer of the directory, files indicating video data (Video), audio data (Audio), proxy data (Proxy), multi-camera data (Multi Camera Info.), coordinate data (Coordinates), and other information (The Other Info.).

The multi-camera data file includes, in a further lower layer of the directory, a multi-camera flag, a master/slave flag, slave numbers and slave IDs (slave ID 1, slave ID 2, . . . ) of the slave cameras 2B and 2C when this UMID is allocated to the master camera 2A, and master ID of the master camera 2A when this UMID is allocated to the slave camera 2B or 2C.

The metadata processor 25 links addresses supplied from the command processor 21 based on the IDs obtained from the multi-camera data in the metadata-based file system, and stores the resulting metadata in a metadata storage unit 28 according to the linked address. The data conversion processor 24 stores the video data and the audio data in the video storage unit 26 and the audio storage unit 27, respectively, according to the address determined by the metadata processor 25.

When the metadata processor 25 detects the ON state of the multi-camera flag in the multi-camera data in the metadata-based file system and determines that the content data has been captured by the plurality of video cameras 2A to 2C, the metadata processor 25 checks for the ON or OFF state of the master/slave flag in the multi-camera data, and determines whether the capture source of the content data is the master camera 2A or the slave camera 2B or 2C.

When the metadata processor 25 determines that the capture source is the master camera 2A, the metadata processor 25 detects the numbers and IDs of the slave cameras 2B and 2C, and transmits the results to the address processor 23. The address processor 23 determines the number of pieces of the audio-visual material for each of the slave cameras 2B and 2C and the address based on the number and ID of each of the slave cameras 2B and 2C, and supplies the results to the video storage unit 26, the audio storage unit 27, the metadata storage unit 28, and the database 20B in the input unit 20.

When the metadata processor 25 determines that the capture source is the slave camera 2B or 2C, the metadata processor 25 detects the ID of the master camera 2A, and transmits the result to the address processor 23. The address processor 23 determines the address of the audio-visual material captured by the master camera 2A based on the ID of the master camera 2A, and supplies the result to the video storage unit 26, the audio storage unit 27, the metadata storage unit 28, and the database 20B in the input unit 20.

The video storage unit 26, the audio storage unit 27, and the metadata storage unit 28 therefore store the video data, the audio data, and the metadata according to the determined address. In the database 20B in the input unit 20, the directory structure is re-constructed based on the determined address.

Thus, the server 3 allows the video data, the audio data, and the metadata stored in the video storage unit 26, the audio storage unit 27, and the metadata storage unit 28 to be easily searched based on the audio-visual material captured by the master camera 2A for the audio-visual material recorded at the same time by the slave cameras 2B and 2C, and to be easily searched based on the audio-visual material captured by the slave camera 2B or 2C for the audio-visual material recorded at the same time by the master camera 2A.

Thus, even if content data captured by the video cameras 2A to 2C are supplied to the server 3, it can automatically be determined whether the audio-visual material corresponding to the supplied content data was recorded by the master camera 2A or the slave camera 2B or 2C by searching for the storage file, the file name, the recording time, etc., on the database 20B.

In the server 3, when the metadata processor 25 detects the ON state of the multi-camera flag in the multi-camera data in the metadata-based file system and determines that the content data has been captured by the plurality of video cameras 2A to 2C, the metadata processor 25 converts the coordinate data in the file system from GPS coordinates indicating the current position of each of the video cameras 2A to 2C to the relative coordinates with respect to the position of the object OB, and then updates the coordinate data.

Figure 4A:
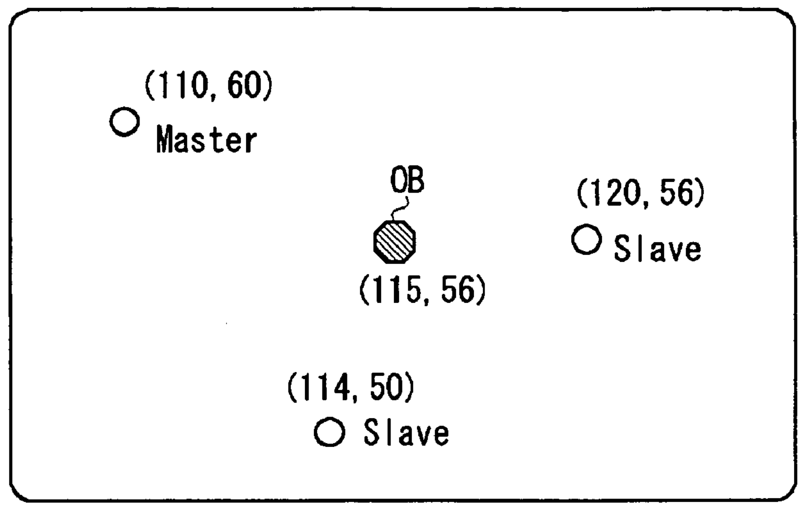
FIGS. 4A and 4B are schematic plan views for showing an operation to convert GPS coordinates into relative coordinates.
Figure 4B:
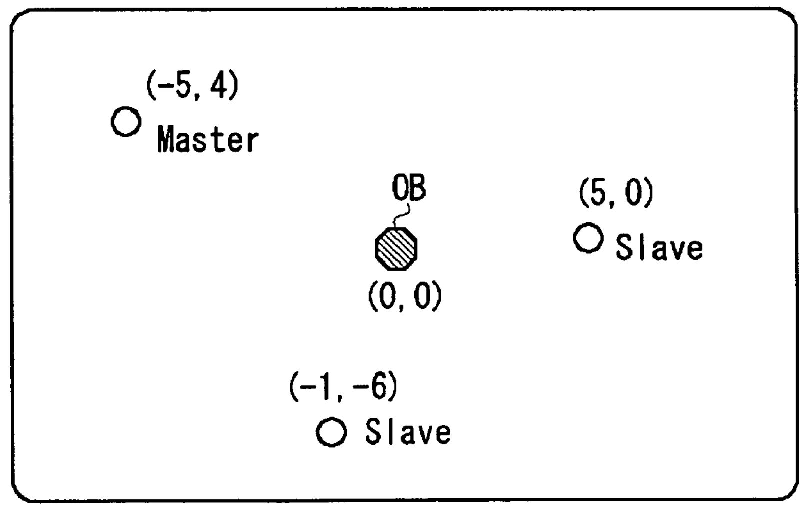

For example, as shown in FIG. 4A, the coordinates indicating the position of the object OB measured using GPS are (115, 56) and the coordinates indicating the positions of the master camera 2A and the slave cameras 2B and 2C measured using GPS are (110, 60), (114, 50), and (120, 56), respectively. In this case, as shown in FIG. 4B, assuming that the position of the object OB is defined as the virtual center coordinates (0, 0), the coordinates of the master camera 2A are converted into the relative coordinates (−5, 4) and the coordinates of the slave cameras 2B and 2C are converted into the relative coordinates (−1, −6) and (5, 0), respectively.

Figure 5:
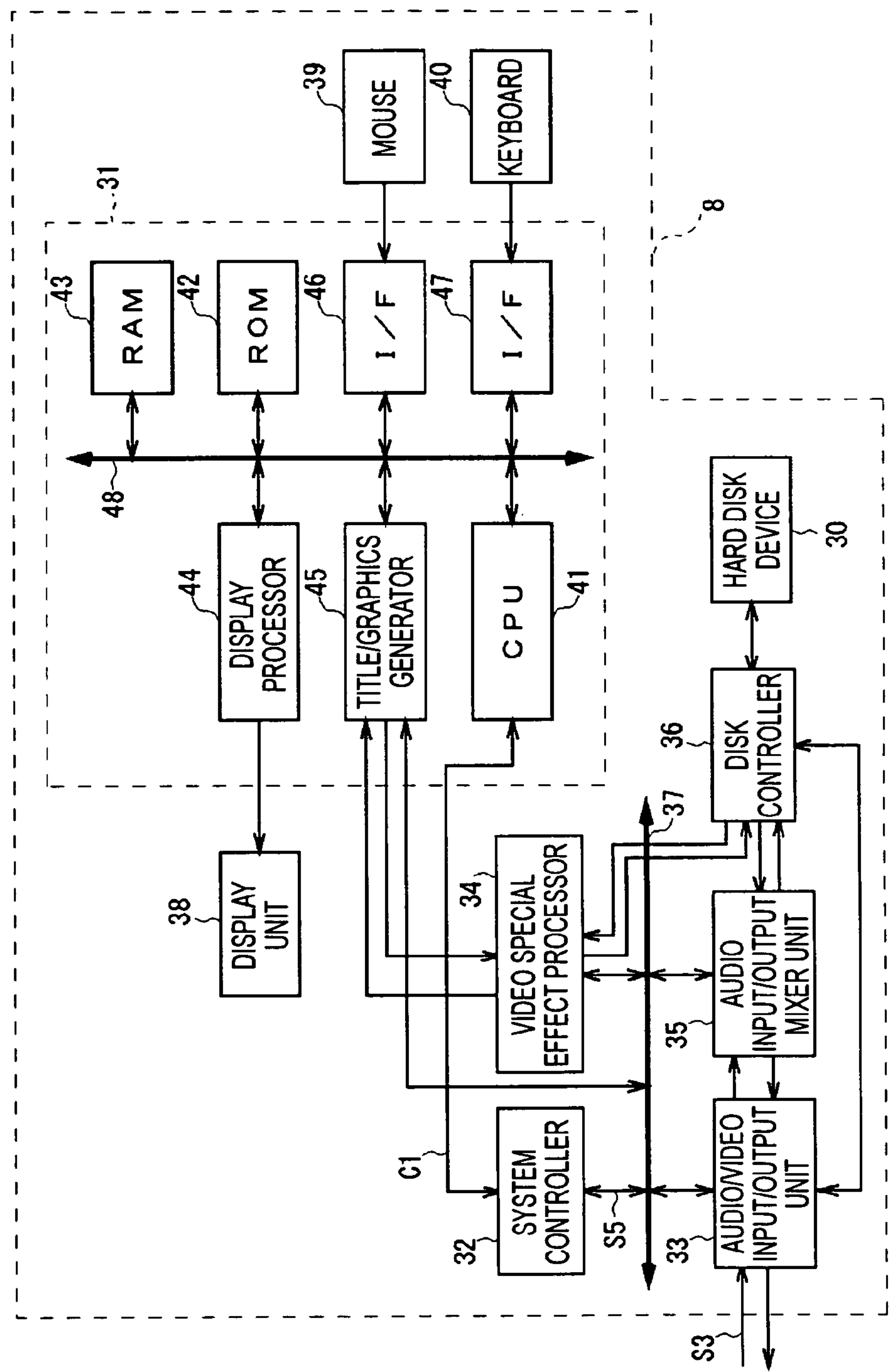
FIG. 5 is a block diagram of an editing terminal device shown in FIG. 1.

FIG. 5 shows the internal structure of the editing terminal device 8. The editing terminal device 8 is configured to register desired audio and video portions of the content data S3 supplied from the server 3 (see FIG. 2) as clips and to load a video signal and an audio signal of a desired clip to a hard disk device 30, if necessary.

The editing terminal device 8 is also configured to create an editing list defining editing description for combining the registered clips as desired to create desired edited audio and video, and to actually edit the clips according to the created editing list to output the edited audio and video to the outside.

The editing terminal device 8 includes a computer 31, a system controller 32, an audio/video input/output unit 33, a video special effect processor 34, an audio input/output mixer unit 35, and a disk controller 36, which are connected with one another via a control bus 37.

Initially, the computer 31 displays a predetermined operation view (hereinafter referred to as an “editing view”) on a display unit 38. In the computer 31, when a mouse 39 is operated at this state, a clip registration mode is selected. When a reproduction instruction is input from the server 3 (see FIG. 2) connected to the editing terminal device 8, the computer 31 transmits a control command C1 corresponding to the input operation to the system controller 32.

The system controller 32 transmits a control signal S5 to the server 3 in response to the supplied control command C1 so that an operation to reproduce the video signal and audio signal stored in the server 3 is executed. As a result, the video signal and the audio signal are output from the server 3 to the video special effect processor 34 via the audio/video input/output unit 33.

The video special effect processor 34 transmits the video signal supplied from the video/audio input/output unit 33 to the computer 31 under the control of the system controller 32. The display unit 38 is controlled by the computer 31 to display an image corresponding to the video signal at a predetermined position in the editing view.

The editing terminal device 8 allows an operator to specify a desired audio-visual portion using the mouse 39 and a keyboard 40 based on the video displayed on the display unit 38 and the audio output from a loudspeaker (not shown), and to register the specified portion as a clip and data related to the clip, such as the in-point and out-point time codes and the material length (or the duration of the recording), in the computer 31.

When a preload mode is selected, the computer 31 transmits a control command C1 corresponding to this operation to the system controller 32. The system controller 32 transmits a control signal S5 to the server 3 in response to the supplied control command C1 so that the audio and video in the specified clip are reproduced by the server 3, and controls the audio/video input/output unit 33 via the control bus 37 to load the video signal and audio signal transmitted from the server 3.

The disk controller 36 sequentially loads the video signal supplied from the video special effect processor 34 or the audio/video input/output unit 33 and the audio signal supplied from the audio input/output mixer unit 35 or the audio/video input/output unit 33 based on a command supplied from the system controller 32 via the control bus 37, and supplies the loaded signals to the hard disk device 30 to record the loaded signals at specified addresses in the hard disk device 30.

In the editing terminal device 8, therefore, audio and video in a specified clip can be reproduced from the server 3 and can then be loaded in the hard disk device 30.

In the computer 31, when clips are registered in the manner described above, a list of the registered clips is displayed on the editing view on the display unit 38.

The operator creates, as an editing list, editing data defining editing description indicating which clips are combined and how on the editing view. After or while creating the editing list, the operator views the audio and video edited according to the editing list.

The computer 31 includes a central processing unit (CPU) 41, a read-only memory (ROM) 42, a random access memory (RAM) 43, a display processor 44, a title/graphics generator 45, and interface circuits 46 and 47, which are connected via a CPU bus 48. The mouse 39 and the keyboard 40 are connected via the interface circuits 46 and 47, respectively.

The CPU 41 reads image data stored in the ROM 42, if necessary, according to a program stored in the ROM 42, and supplies the read image data to the display unit 38 via the display processor 44 so that an editing view and dialogs described below, a cursor moving in the editing view along with operation of the mouse 39, and numbers and characters input through the keyboard 40 are displayed on the display unit 38. A motion picture or a still image based on the video signal supplied to the display processor 44 from the video special effect processor 34 via the title/graphics generator 45 is also displayed at a predetermined position in the editing view.

For example, when an instruction to execute a certain operation is given through the interface circuits 46 and 47 by operating the mouse 39 and the keyboard 40, the CPU 41 transmits a control command C1, if necessary, according to the program stored in the ROM 42 to the system controller 32, and the system controller 32 controls the audio/video input/output unit 33, the video special effect processor 34, the audio input/output mixer unit 35, and/or the disk controller 36 to execute a predetermined operation. Therefore, the editing terminal device 8 performs the operations described above.

The CPU 41 further controls the title/graphics generator 45 to generate title characters and graphic image data, if necessary, according to the program stored in the ROM 42. The title characters and graphic image data are transmitted to the video special effect processor 34 so as to be reflected in the edited video.

Figure 6:
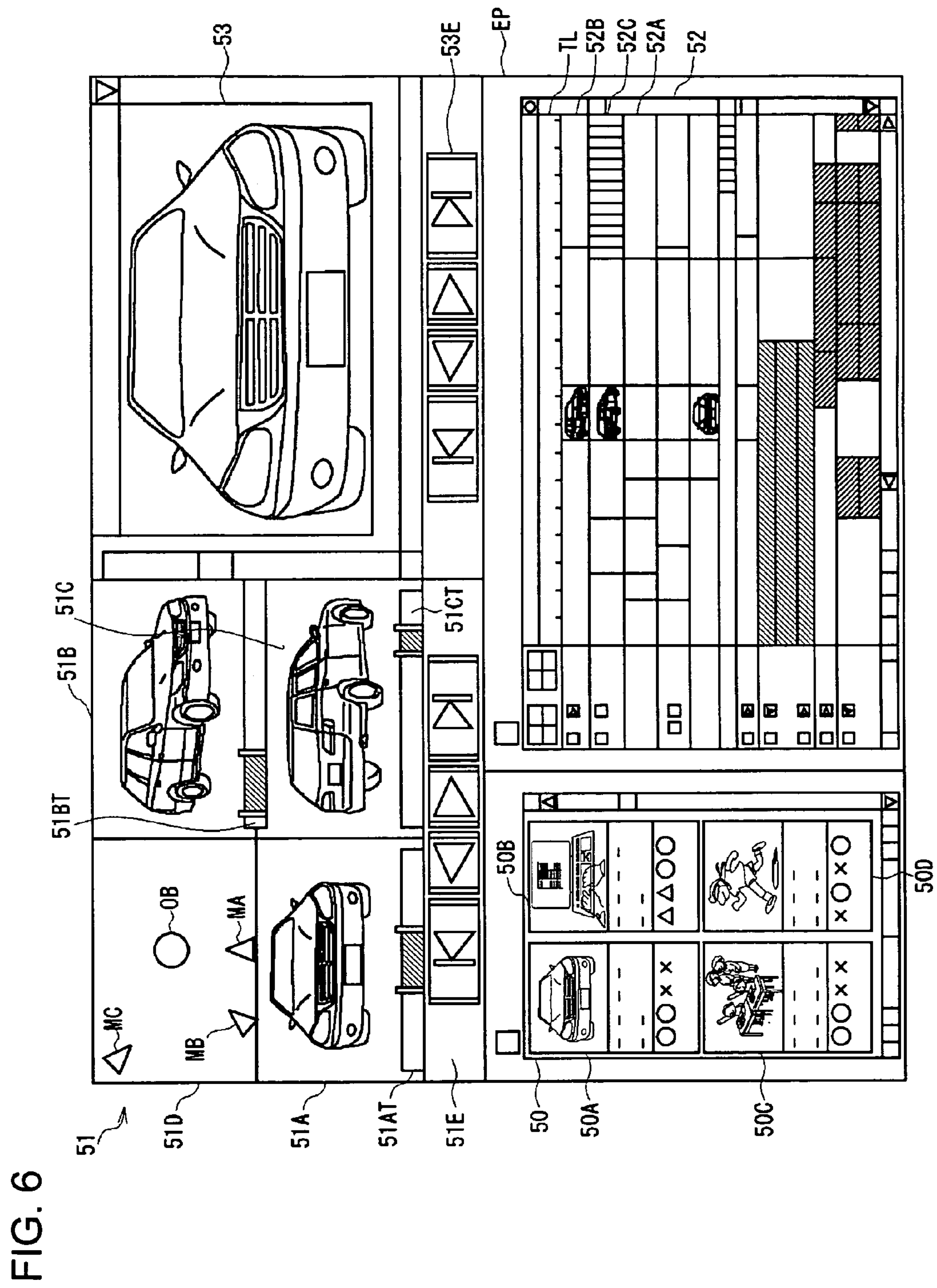
FIG. 6 is a schematic plan view showing an editing view displayed on a screen.

An actual display view in the multi-camera mode will be described. When the multi-camera mode is set by the operator, the CPU 41 of the computer 31 in the editing terminal device 8 displays an editing view EP shown in FIG. 6 on the display unit 38 according to the program stored in the ROM 42.

The editing view EP includes a material display section 50 in which first images in the plurality of registered clips are displayed, a material confirmation section 51 in which recordings of a specified clip made by all video cameras are visually displayed, an editing list creation section 52 in which an editing list is created, and an editing confirmation section 53 in which an edited view is displayed.

In the material display section 50, identification view portions 50A to 50N individually corresponding to the plurality of registered clips are displayed in a predetermined arrangement, where N is a natural number. In each of the plurality of identification view portions 50A to 50N, a first image in each clip is displayed as a thumbnail, and registered data (e.g., the recording time, text, etc.) related to each clip is displayed below the thumbnail image. In the material display section 50, in order to allow the operator to identify the audio-visual material captured by the plurality of video cameras 2A to 2C based on the metadata, for example, the first image in the clip corresponding to the audio-visual material is outlined in red.

In the material confirmation section 51, an identification view portion (e.g., 50A) selected by the operator from the plurality of identification view portions 50A to 50N displayed in the material display section 50 is picked up, and the video views of the picked-up clip captured at the same time by the plurality of video cameras 2A to 2C are displayed in view portions (hereinafter referred to as "video view portions") 51A to 51C. The positional relationship of the video cameras 2A to 2C is also displayed in a view portion (hereinafter referred to as a "position view portion") 51D having a predetermined display format.

The material confirmation section 51 includes operation buttons 51E in a lower portion thereof. The operation buttons 51E are operated to perform operations, such as playback, rewind, and variable-rate playback, of the plurality of displayed video view portions 51A to 51C for display. In the video view portions 51A to 51C, time-line indicators 51AT to 51CT from the beginning to the end of the first images of a given clip are displayed.

In the position view portion 51D, the positions of the plurality of video cameras 2A to 2C with respect to the position of the object OB are indicated by marks (hereinafter referred to as "position marks") MA to MC. For example, the position marks MA to MC are indicated based on the positional relationship, shown in FIG. 4B, defined by the relative coordinates (−5, 4) of the master camera 2A and the relative coordinates (−1, −6) and (5, 0) of the slave cameras 2B and 2C, assuming that the position of the object OB is defined as the virtual center coordinates (0, 0).

In the editing list creation section 52, the operator specifies the in-point and the out-point of a video portion to be registered as a clip on a time line TL while visually checking the video displayed in the video view portions 51A to 51C in the material confirmation section 51, and registers the portion between the in-point and the out-point as a clip. A frame corresponding to the registered clip can also be displayed for each of tracks 52A to 52C corresponding to the video cameras 2A to 2C.

The data related to the clip displayed on the display unit 38, such as the in-point and out-point time codes, the material length, and the storage location, is loaded as a database in the RAM 43 in the computer 31 (see FIG. 5).

In the editing list creation section 52, therefore, a frame is displayed for each of the tracks 52A to 52C corresponding to the video cameras 2A to 2C. This means that the audio or video of the clip corresponding to this frame is displayed or output at the time indicated by the time scale when the edited audio and video are output. This operation allows for creation of an editing list sequentially defining the clip video or audio to be displayed as edited video in the editing confirmation section 53 or to be output as edited audio.

The editing confirmation section 53 has operation buttons 53E in a lower portion thereof. The operation buttons 53E are operated to perform operations, such as playback, rewind, and variable-rate playback, of the edited video for display.

In FIG. 1, when unedited content data is to be distributed over a network, the editing terminal device 8 converts the content data into web content, and supplies the web content to the web server 11. In this case, GUI (graphic user interface) display data similar to the material confirmation section 51 in the editing view EP (see FIG. 6) is added to the web content.

Figure 7:
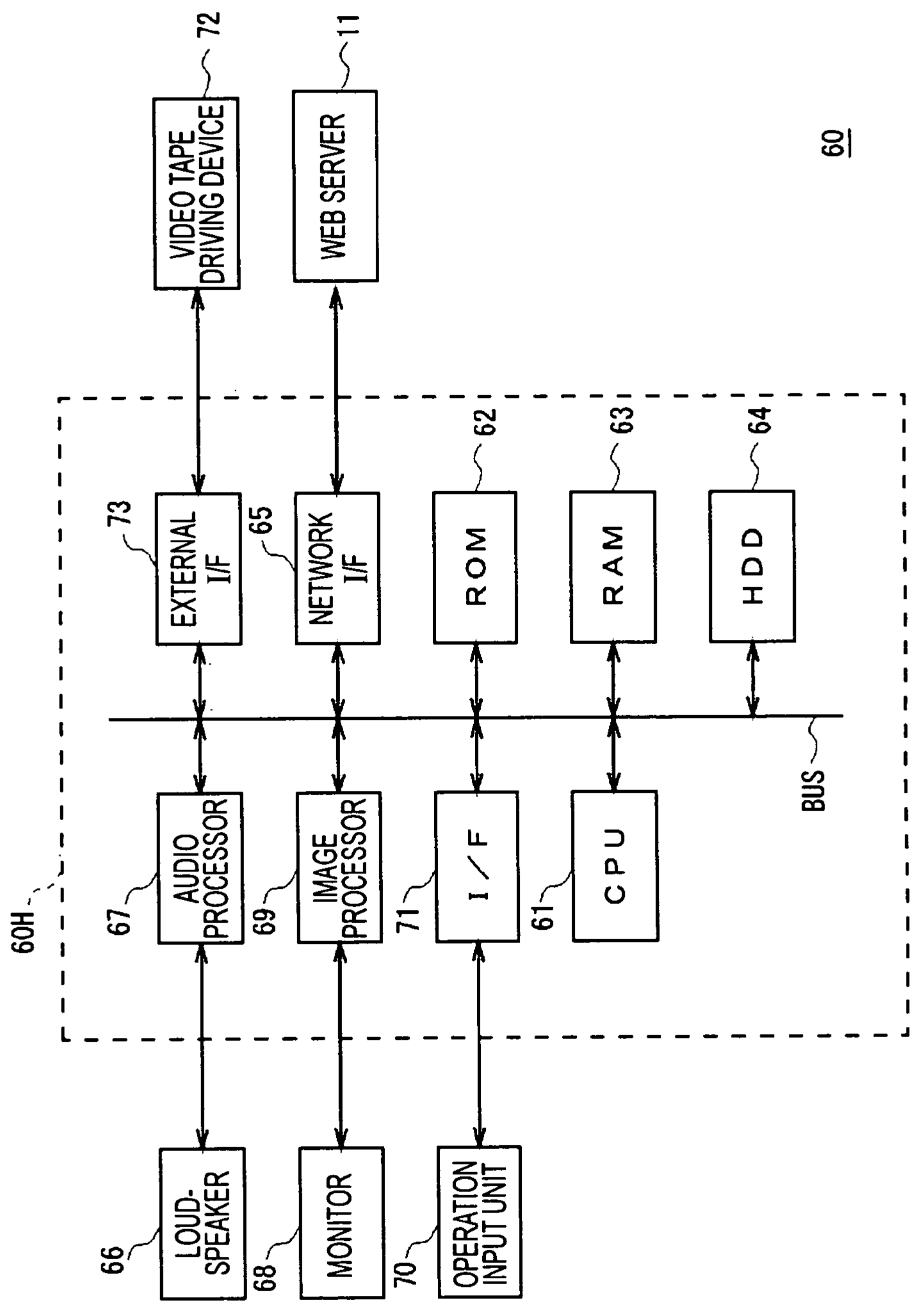
FIG. 7 is a block diagram of a display control apparatus.

FIG. 7 shows the structure of a display control apparatus 60 that receives the web content from the web server 11 (see FIG. 1) via a network, such as the Internet.

The display control apparatus 60 is a general-purpose personal computer at home or in an office, and is designed to communicate with another personal computer or the web server 11 over a network to exchange necessary data or to display a web page view based on screen data obtained through the communication on a monitor.

A main unit 60H of the display control apparatus 60 includes a CPU 61 controlling the overall apparatus, a ROM 62 storing various software, a RAM 63 serving as a work memory of the CPU 61, a hard disk device 64 storing various data, a network interface 65 through which the CPU 61 communicates with an external device over a network, an audio processor 67 connected to a loudspeaker 66, an image processor 69 connected to a monitor 68, an interface 71 connected to an operation input unit 70 including a keyboard and a mouse, and an external interface 73 for connecting to an external video tape driving device 72, if necessary, which are connected with one another via a bus BUS.

The CPU 61 loads the web content supplied via the network interface 65 from the web server 11 that has accessed the display control apparatus 60 via a network, and performs processing based on the web content and the software stored in the ROM 62.

As a result of the processing, a display view (hereinafter referred to as a "GUI view") 80, shown in FIG. 8, based on GUI display data is displayed on the monitor 68 by the CPU 61. The GUI view 80 has a material confirmation section 81 in which recordings made by the plurality of video cameras 2A to 2C are visually displayed, and an extended view section 82 in which a view specified in the material confirmation section 81 is extended and displayed.

The material confirmation section 81 has video view portions 81A to 81C in which video views captured by the video cameras 2A to 2C are displayed, and a position view portion 81D in which the positional relationship of the video cameras 2A to 2C is displayed. In the position view portion 81D, the positions of the plurality of video cameras 2A to 2C with respect to the position of the object OB are indicated by position marks MA to MC.

For example, when the operator selects the video camera 2A through the operation input unit 70, the position marks MA to MC corresponding to the positions of the plurality of video cameras 2A to 2C change in a linked manner based on the position information, the time code, etc., of the selected video camera 2A.

In the extended view section 82, the view captured by one of the video cameras 2A to 2C specified by the operator (In this example, the video camera 2A) is extended and displayed. Operation buttons 82E in a lower portion of the extended view section 82 are operated to perform operations, such as playback, rewind, variable-rate playback, of the extended view.

In the display control apparatus 60 shown in FIG. 7, when the user specifies a certain start point and end point in a state where the position marks MA to MC corresponding to the positions of the plurality of video cameras 2A to 2C are displayed on the monitor 68, the CPU 61 records movement in the coordinates of the position marks MA to MC within a period of time between the specified start and end points as previous position information in a user's favorite file in the hard disk device 64 or an external memory (not shown). When the user retrieves this file later, the previous positions of the video cameras 2A to 2C can be reproduced based on the previous position information.

Figure 9:
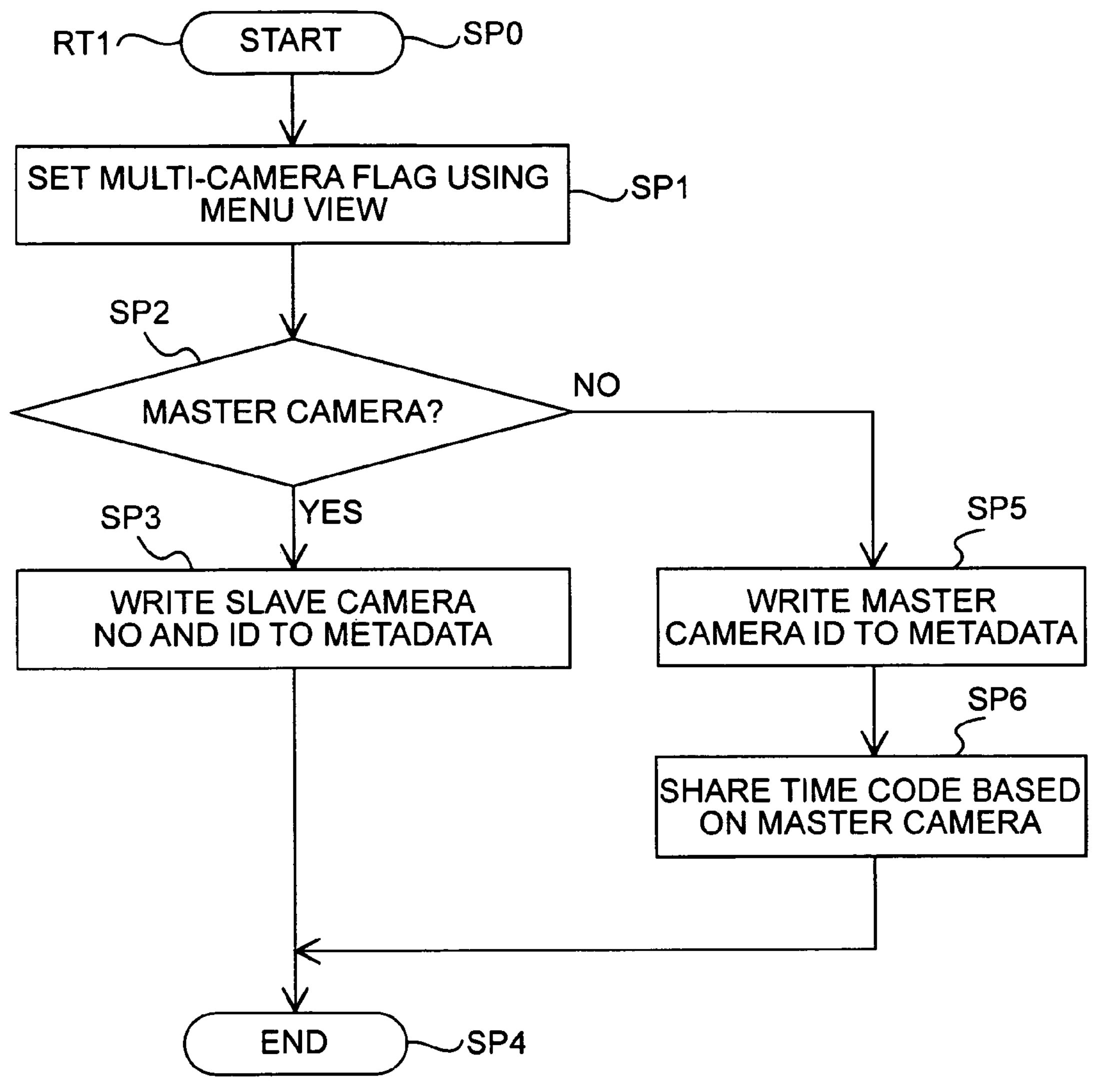
FIG. 9 is a flowchart showing a capture pre-processing routine.

FIG. 9 shows a capture pre-processing routine RT1 executed in the server system 1. When the operator selects a multi-camera capture mode, a CPU (not shown) in the main unit of each of the video cameras 2A to 2C initiates the capture pre-processing routine RT1 shown in FIG. 9 in step SP0. In step SP1, a multi-camera flag is set using a predetermined menu view.

In step SP2, the CPU determines whether or not the corresponding camera is the master camera 2A. In the case of the master camera 2A (YES in step SP2), in step SP3, the numbers and IDs of the slave cameras 2B and 2C are written to the metadata. Then, in step SP4, the capture pre-processing routine RT1 ends.

If it is determined in step SP2 that the corresponding camera is not the master camera 2A (NO in step SP2), i.e., in the case of the slave camera 2B or 2C, then in step SP5, the CPU writes the ID of the master camera 2A to the metadata. In step SP6, the time code is shared based on the master camera 2A. Then, in step SP4, the capture pre-processing routine RT1 ends.

Therefore, in the stage previous to the multi-camera capture stage, the positional relationship and the time relationship between the master camera 2A and the slave cameras 2B and 2C can be set in advance as data in the metadata of the plurality of video cameras 2A to 2C.

Figure 10:
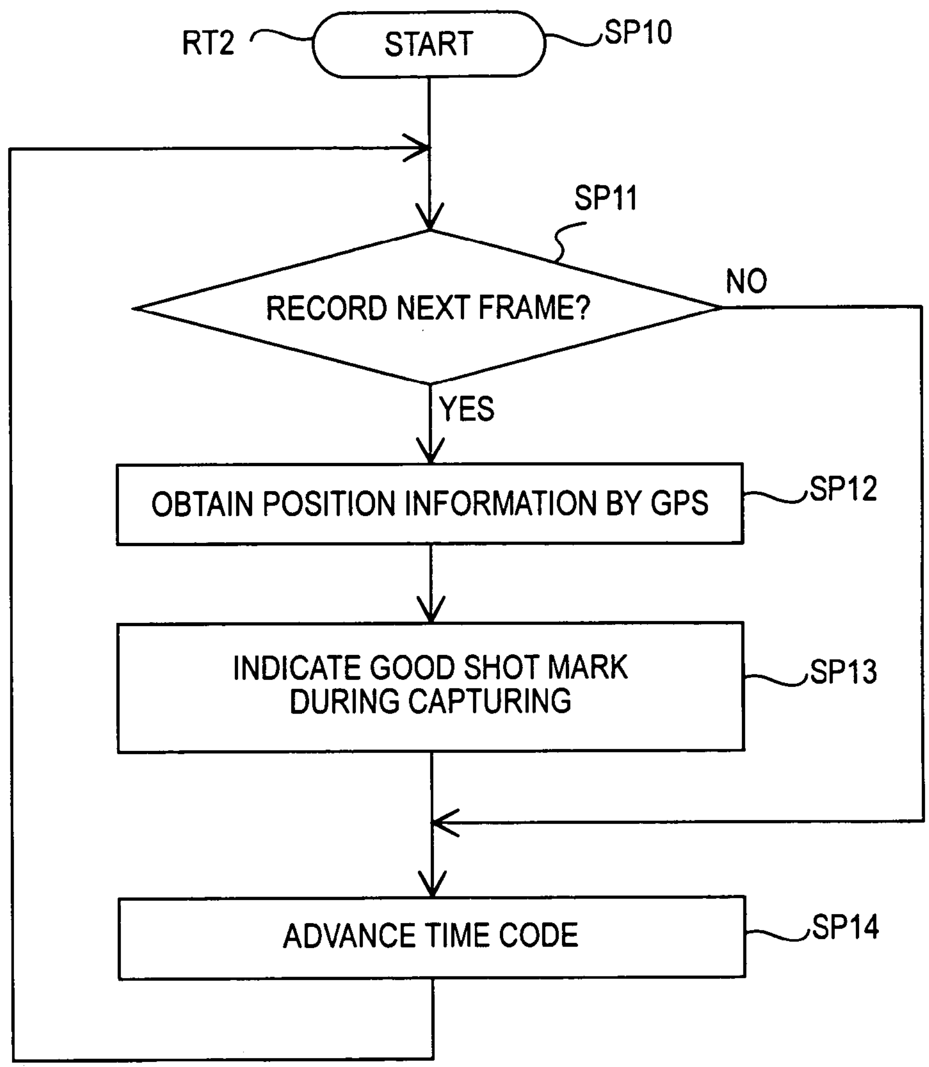
FIG. 10 is a flowchart showing a capture processing routine.

FIG. 10 shows a capture processing routine RT2 executed in the server system 1. When the operator initiates a multi-camera capture operation, a CPU (not shown) in the main unit of each of the video cameras 2A to 2C initiates the capture processing routine RT2 shown in FIG. 10 in step SP10. In step SP11, it is determined whether or not the next frame is to be recorded.

If it is determined in step SP11 that the next frame is to be recorded (YES in step SP11), then in step SP12, the CPU obtains the coordinate data indicating the GPS position information. In step SP13, any mark added by the operator during capturing, e.g., a good shot mark, is indicated.

In step SP14, the CPU advances the time code by one frame, and returns to step SP11 to repeat a loop operation on a frame basis until the corresponding camera is powered off.

If it is determined in step SP11 that the next frame is not to be recorded (NO in step SP11), then in step SP14, the CPU advances the time code by one frame, and returns to step SP11 to repeat a loop operation on a frame basis until the corresponding camera is powered off.

In the multi-camera capture stage, therefore, only for a frame to be recorded, the relative positional relationship of the video cameras 2A to 2C, the time codes of the slave cameras 2B and 2C synchronized with the time code of the master camera 2A, GPS information, etc., can be recorded as data in the metadata of the plurality of video cameras 2A to 2C necessary during capturing.

Figure 11:
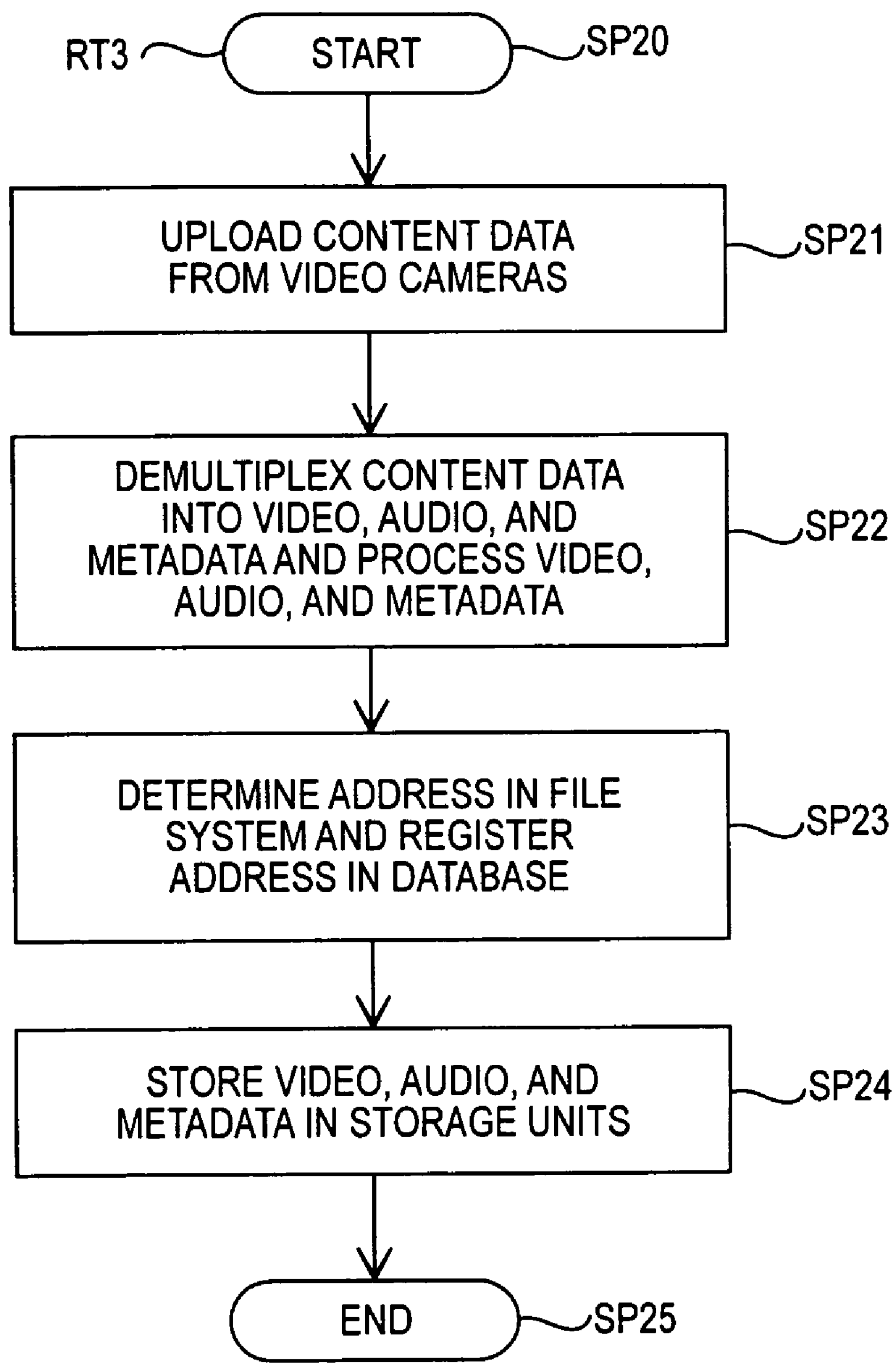
FIG. 11 is a flowchart showing an internal server processing routine.

FIG. 11 shows an internal server processing routine RT3. When the operator selects storage of results of a multi-camera capture operation, a controller (not shown) in the server 3 for controlling the overall server 3 initiates the internal server processing routine RT3 shown in FIG. 11 in step SP20. In step SP21, content data is uploaded from the video cameras 2A to 2C.

In step SP22, the controller controls the multiplexer/demultiplexer 22 to demultiplex the content data into video data, audio data, and metadata, and controls the data conversion processor 24 and the metadata processor 25 to perform necessary processing on the demultiplexed data.

In step SP23, the controller controls the metadata processor 25 to determine the address of the corresponding audio-visual material based on the IDs obtained from the multi-camera data in the metadata-based file system and to register the address in the database 20B in the input unit 20.

In step SP24, the controller stores the video data, the audio data, and the metadata in the video storage unit 26, the audio storage unit 27, and the metadata storage unit 28, respectively. Then, in step SP25, the internal server processing routine RT3 ends.

In the server 3, therefore, the video data, the audio data, and the metadata stored in the video storage unit 26, the audio storage unit 27, and the metadata storage unit 28 can easily be searched based on the audio-visual material captured by the master camera 2A for the audio-visual material recorded at the same time by the slave camera 2B or 2C, and can also easily be searched based on the audio-visual material captured by the slave camera 2B or 2C for the audio-visual material recorded at the same time by the master camera 2A.

Figure 12:
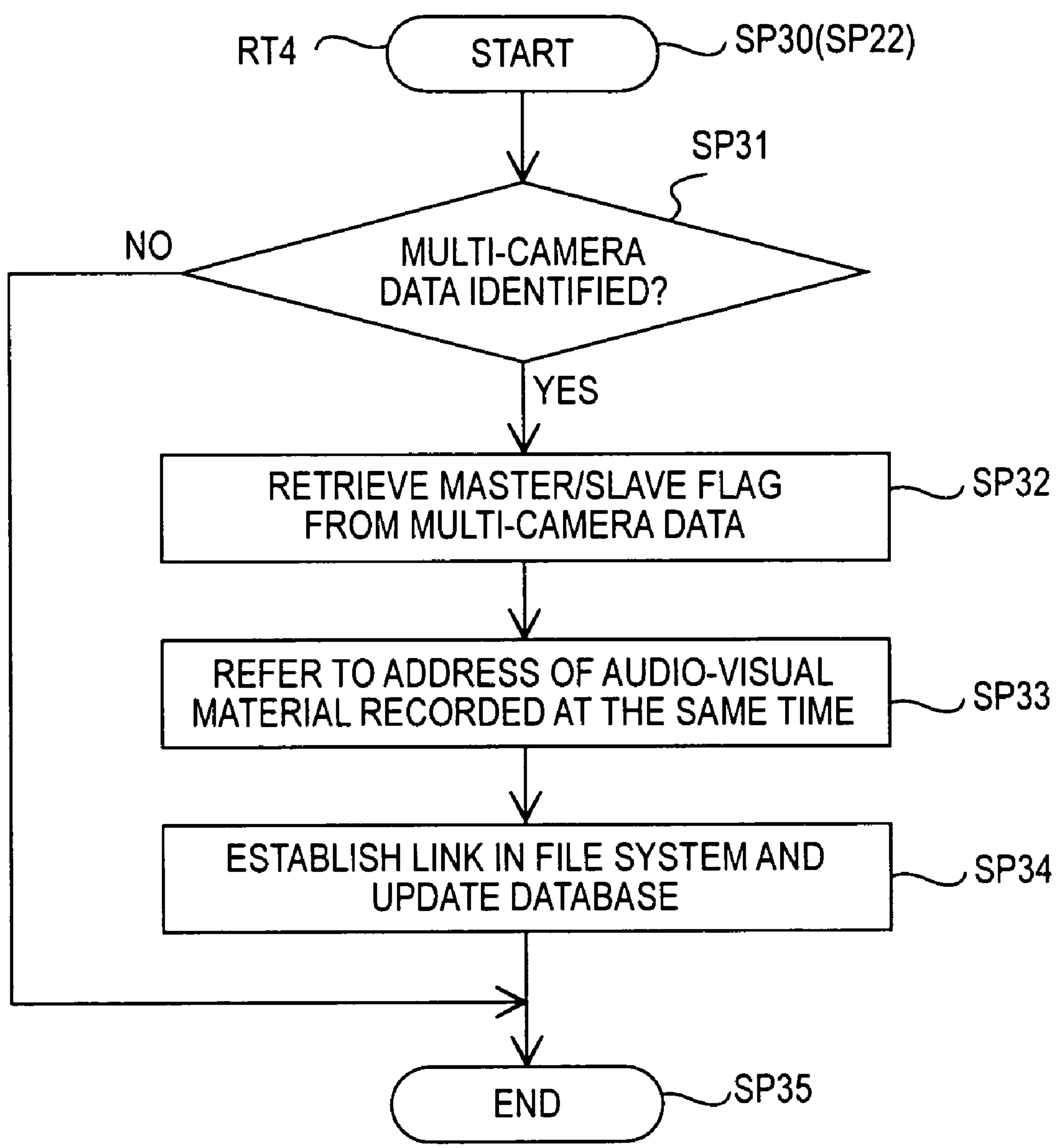
FIG. 12 is a flowchart showing the internal server processing routine.

In step SP22 of the internal server processing routine RT3 shown in FIG. 11, when metadata is obtained by demultiplexing the content data, the controller initiates an internal server processing routine RT4 shown in FIG. 12 in step SP30. In step SP31, it is determined whether or not the multi-camera data in the metadata has been identified.

If it is determined in step SP31 that the multi-camera data has been identified (YES in step SP31), in step SP32, the controller detects the master/slave flag from the multi-camera data. In this case, the controller detects the numbers and IDs of the slave cameras 2B and 2C in the case of the master camera 2A, and detects the ID of the master camera 2A in the case of the slave camera 2B or 2C.

When the address of the audio-visual material recorded at the same time is referred to in step SP32, the controller modifies and reconstructs the directory structure in the database 20B in the input unit 20. Then, in step SP35, the internal server processing routine RT4 ends.

In the server 3, therefore, when the multi-camera data is identified from the metadata, the directory structure in the database 20B in the file system is reconstructed so that the same audio-visual material from either the master camera 2A or the slave camera 2B or 2C can easily be searched for.

Figure 13:
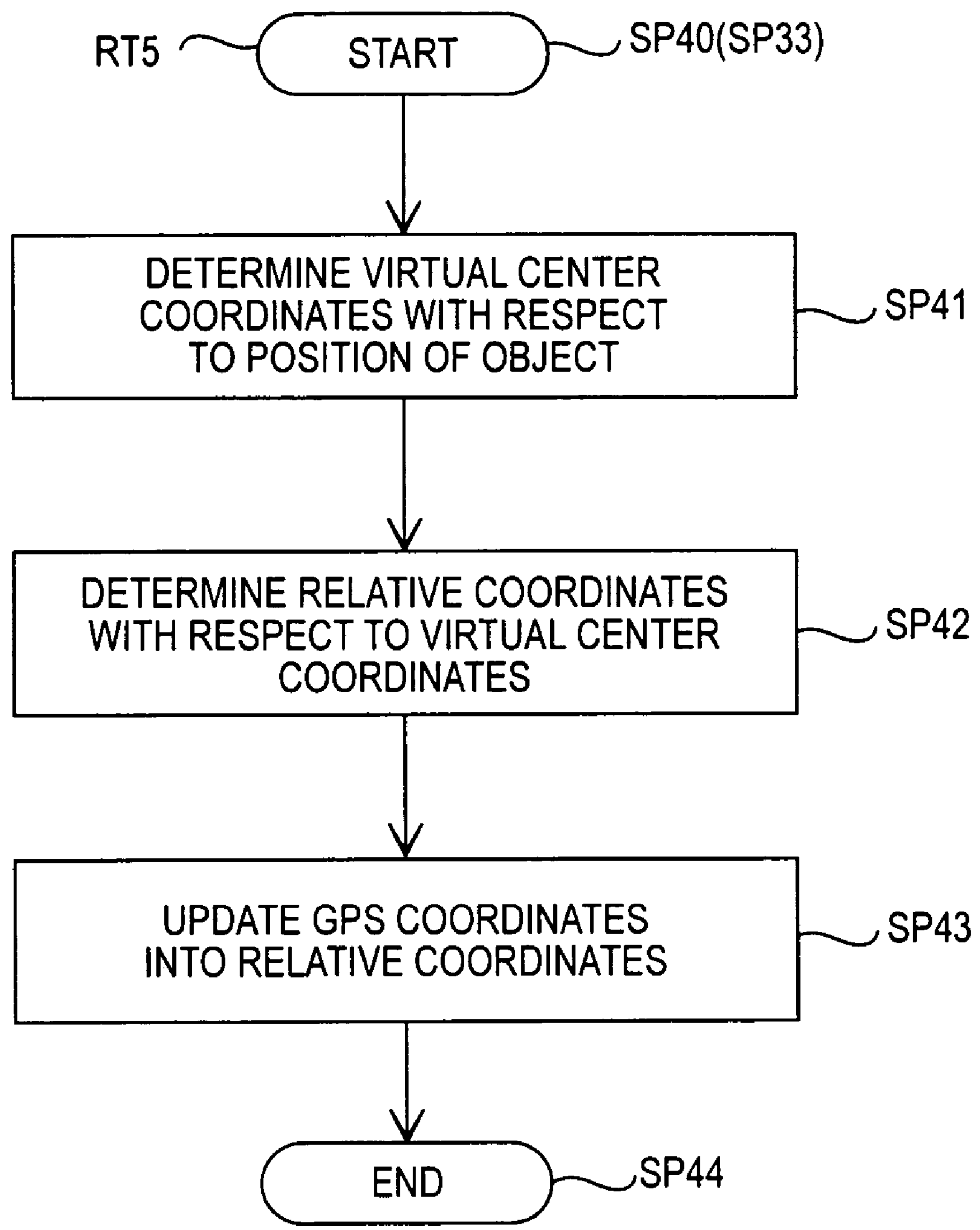
FIG. 13 is a flowchart showing the internal server processing routine.

In step SP33 of the internal server processing routine RT4 shown in FIG. 12, when the address of the audio-visual material recorded at the same time is referred to, the controller initiates an internal server processing routine RT5 shown in FIG. 13 in step SP40. In step SP41, the coordinate data is detected from the metadata, and the virtual center coordinates using the position of the object OB as a reference is determined based on the detected coordinate data.

In step SP42, the controller performs a calculation for converting the GPS coordinates indicating the current position of each of the video cameras 2A to 2C into the relative coordinates with respect to the virtual center coordinates.

In step SP43, the controller updates the coordinate data so that the GPS coordinates are updated into the relative coordinates. Then, in step SP44, the internal server processing routine RT4 ends.

In the server 3, therefore, the relative positions of the master camera 2A and the slave cameras 2B and 2C with respect to the object OB can easily be determined based on the GPS coordinates. Thus, the efficiency of the operator who processes (e.g., edits) the content data obtained by the multi-camera capture operation can greatly be improved.

With the structure of the server system 1 described above, metadata to be added to each result of a multi-camera capture operation performed using the plurality of video cameras 2A to 2C includes in advance a flag indicating multi-camera capturing and position and time information between a reference video camera, i.e., the master camera 2A, and the remaining slave cameras 2B and 2C dependent on the master camera 2A.

If it is determined that the multi-camera captured content data supplied from the video cameras 2A to 2C is a result of a capture operation performed by the master camera 2A, the server 3 determines the number of pieces of the audio-visual material for each of the slave cameras 2B and 2C and the address based on the number and ID of each of the slave cameras 2B and 2C, and stores the audio-visual material according to the address.

On the other hand, if it is determined that the multi-camera captured content data supplied from the video cameras 2A to 2C is a result of a capture operation performed by the slave camera 2B or 2C, the server 3 determines the address of the audio-visual material captured by the master camera 2A based on the ID of the master camera 2A, and stores the audio-visual material according to the address.

In the server 3, therefore, the audio-visual material recorded at the same time by the master camera 2A and the slave cameras 2B and 2C is stored according to the same address. Thus, the audio-visual material recorded at the same time by the video cameras 2A to 2C other than the capture source can easily be searched for based on only the stored audio-visual material.

In the server 3, therefore, even if content data captured by the plurality of video cameras 2A to 2C are supplied, it can automatically be determined whether the audio-visual material corresponding to the supplied content data is a result of a capture operation performed by the master camera 2A or the slave camera 2B or 2C by searching for the storage file, the file name, the recording time, etc., on the database.

In the server 3, in the multi-camera capture mode using the plurality of video cameras 2A to 2C, the GPS coordinates indicating the current position of each of the video camera 2A to 2C are converted into the relative coordinates with respect to virtual center coordinates indicating the position of the object OB. Thus, the relative positional relationship of the video cameras 2A to 2C can easily be determined in the later editing processing.

Accordingly, in the server system 1, the master-slave relation of the plurality of video cameras 2A to 2C and the position and time information are included in each result of a capture operation. The server 3 that has received the results maintains the positional relationship and the time relationship between the master camera 2A and the slave cameras 2B and 2C, and stores audio-visual material recorded at the same time according to the same address. Thus, the audio-visual material recorded at the same time by the video cameras 2A to 2C other than the capture source can easily be identified based on only the stored audio-visual material, thus improving the editing performance.

Other Embodiments

In the embodiment described above, an information processing apparatus for storing the content data (audio-visual material) S1A to S1C obtained from the plurality of video cameras (capturing means) 2A to 2C by capturing the object OB and for transmitting the content data, if necessary, is implemented as the server 3 in the server system 1 shown in FIG. 1. This embodiment is merely an example, and a wide variety of information processing apparatuses may be used. Although two slave cameras 2B and 2C are used in the embodiment described above, one slave camera or three or more slave cameras may be used.

In the embodiment described above, storing means for allocating a common address to the content data (audio-visual material) S1A to S1C captured by the video cameras (capturing means) 2A to 2C and storing the content data (audio-visual material) S1A to S1C individually captured by the video cameras (capturing means) 2A to 2C according to the common address is implemented as the video storage unit 26, the audio storage unit 27, and the metadata storage unit 28. This embodiment is merely an example, and a wide variety of storage devices capable of storing various data according to the address may be used.

In the embodiment described above, when audio-visual material captured by a specified video camera (capturing means) 2A, 2B, or 2C is read from the video storage unit 26, the audio storage unit 27, and the metadata storage unit 28 (storing means), searching means for searching for the audio-visual material captured by the other video cameras (capturing means) 2A to 2C at the same time as the read audio-visual material is implemented by the metadata processor 25 and the database 20B in the input unit 20 in the server 3. This embodiment is merely an example, and a wide variety of searching devices may be used.

In the embodiment described above, identifying means for identifying the relative positional relationship and the relative positional time relationship of the video cameras (capturing means) 2A to 2C based on the metadata (additional information) added to the content data (audio-visual material) S1A to S1C individually captured by the video cameras (capturing means) 2A to 2C is implemented as the metadata processor 25 and the controller (not shown) in the server 3. This embodiment is merely an example, and a wide variety of identifying devices may be used as long as the video storage unit 26, the audio storage unit 27, and the metadata storage unit 28 (storage means) can store the relative positional relationship and the relative time relationship of the video cameras (capturing means) 2A to 2C identified by the metadata processor (identifying means) 25 so as to be added to the audio-visual material individually captured by the video cameras (capturing means) 2A to 2C.

Figure 14:
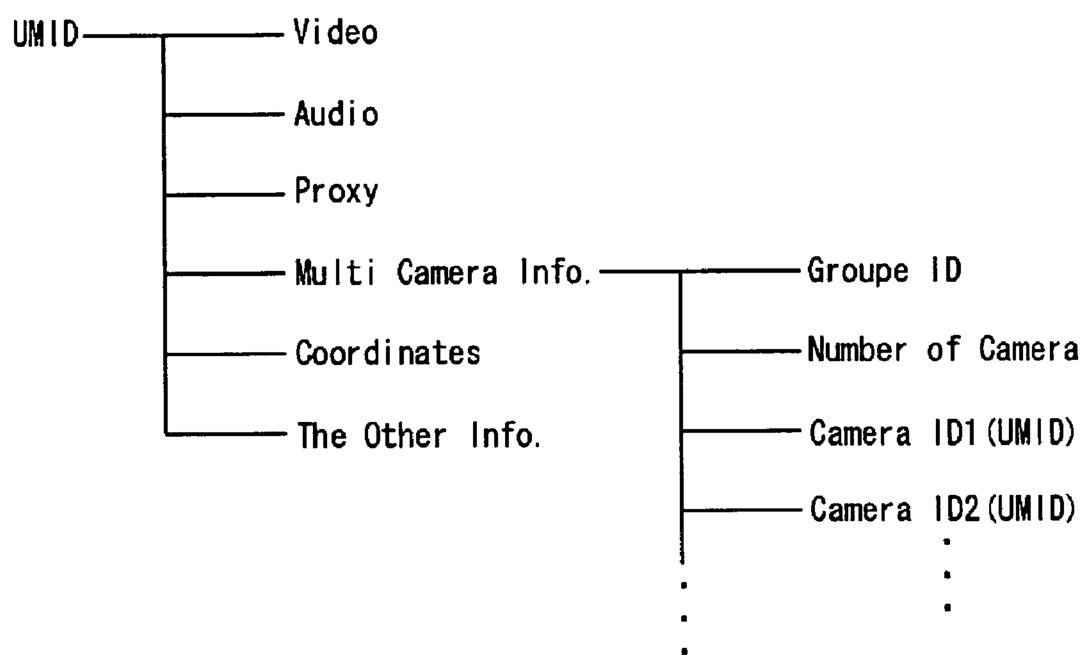
FIG. 14 is a schematic diagram of a file system of a server according to another embodiment of the present invention.

The multi-camera data file shown in FIG. 3 includes a multi-camera flag, a master/slave flag, slave numbers of the slave cameras and slave IDs of the slave cameras 2B and 2C (slave ID1, slave ID2, . . . ) in the case of the master camera 2A, and a master ID of the master camera 2A in the case of the slave camera 2B or 2C. Alternatively, a multi-camera data file shown in FIG. 14 including a group ID shared by the video cameras 2A to 2C, camera numbers of the video cameras 2A to 2C, and camera IDs of the video cameras 2A to 2C (camera ID1, camera ID2, . . . ) may be used.

That is, all video cameras 2A to 2B may be informed that they are involved with the same project and all video cameras 2A to 2C in the same group may be linked, thereby identifying the relative positional relationship and the relative time relationship of the video cameras 2A to 2B without the provision of the master-slave relation.

If all video cameras 2A to 2B have a plurality of groups, regardless of the provision of master-slave relation, predetermined weights may be set on a group ID basis so that searching, displaying, or other processing may be performed based on the weights.

In the embodiment described above, converting means for converting the current position of each of the video cameras (capturing means) 2A to 2C that are measured in each of the video cameras (capturing means) 2A to 2C into the relative positions with respect to the position of a specified one of the video cameras (capturing means) 2A to 2C or the object OB is implemented as the metadata processor 25 and the controller (not shown) in the server 3. This embodiment is merely an example, and a wide variety of converting devices may be used as long as the relative positional relationship of the video cameras (capturing means) 2A to 2C can be determined.

In the server 3, in the multi-camera capture mode using the plurality of video cameras 2A to 2C, the GPS coordinates indicating the current position of each of the video cameras 2A to 2C are converted into the relative coordinates with respect to virtual center coordinates indicating the position of the object OB. The GPS coordinates of the slave cameras 2B and 2C may be converted into the relative coordinates with respect to virtual center coordinates indicating the position of the master camera 2A to achieve similar advantages. In this case, a simpler calculation can be realized since it is not necessary to determine the GPS coordinates of the object OB.

In the embodiment described above, the server 3 shown in FIG. 2 is separately provided with the video storage unit 26, the audio storage unit 27, and the metadata storage unit 28. This embodiment is merely an example, and audio, video, and metadata may be stored in a single storage unit. Audio and video data may be handled as the same file or separate files.

Figure 8:
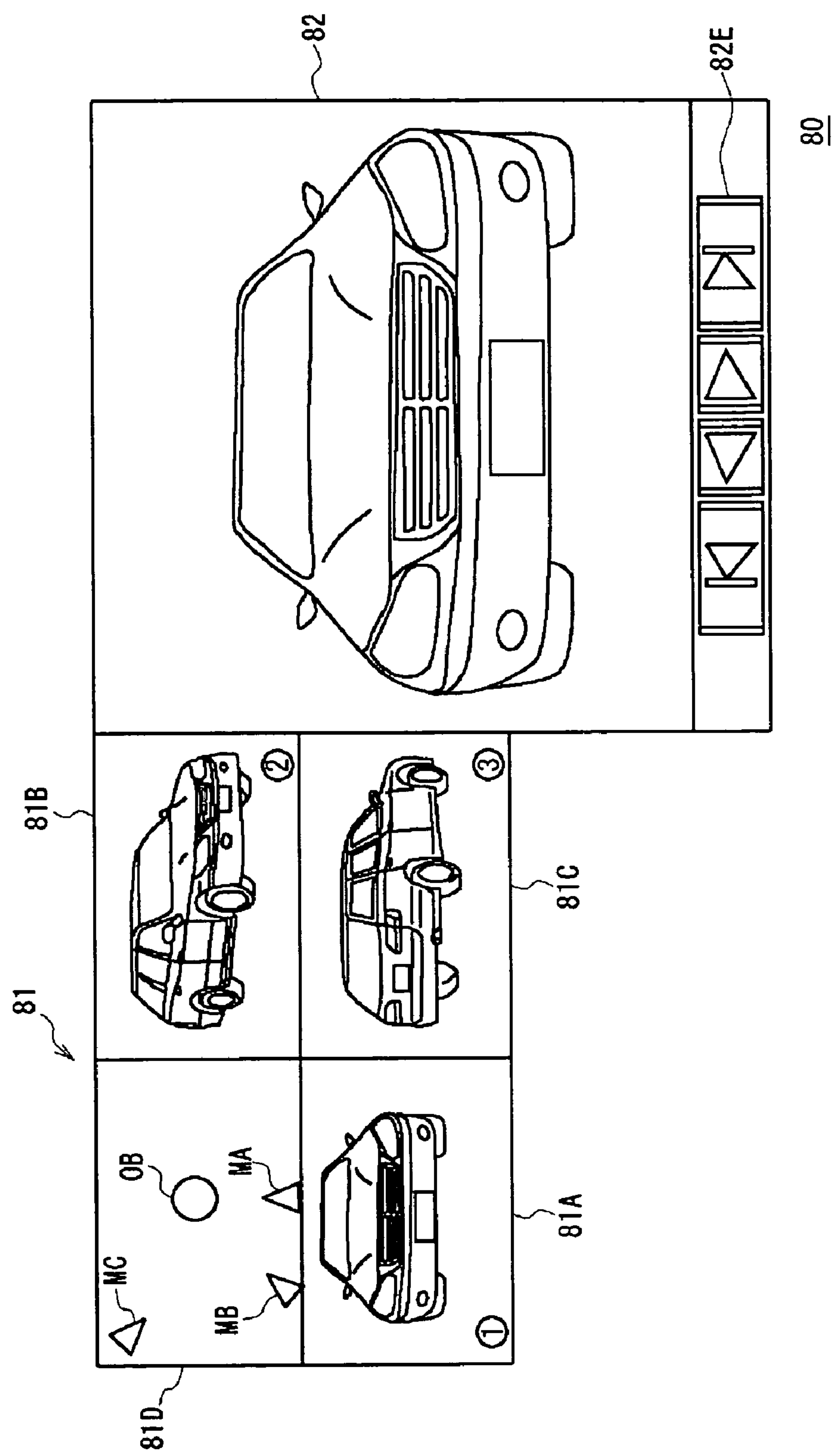
FIG. 8 is a schematic plan view showing a GUI view in web content displayed on a screen.

In the embodiment described above, the editing view EP shown in FIG. 6 or the GUI view 80 shown in FIG. 8 is displayed as a GUI view to be displayed on the display unit 38 in the editing terminal device 8 or the monitor 68 of the display control apparatus 60. This embodiment is merely an example, and any other display method may be used.

For example, audio-visual material captured by a plurality of master cameras corresponding to a plurality of groups or each of the groups and the audio-visual material captured by a plurality of slave cameras may appropriately be displayed. In this case, the operator who is to perform an editing operation and the user who is to listen to audio distributed by streaming may appropriately select the audio-visual material captured by a specified camera, and may view the selected audio-visual material in, for example, a different window.

In the embodiment described above, a GUI view is displayed using the editing terminal device 8 and the display control apparatus 60 so that the editing view EP (see FIG. 6) and the GUI view 80 (see FIG. 8), or a web content browser, are displayed as GUI. This embodiment is merely an example, and a variety of GUI views may be displayed using any other device.

For example, a personal computer, a video camera, a digital still camera, a portable information terminal (such as a portable phone or a portable game device), a car navigation apparatus, etc., may be used as devices for displaying GUI views. Another device integrally incorporating a capturing unit and a capture position measurement unit, such as a camera-equipped (and GPS-equipped) portable phone, may also be used.

While the embodiment has been described in the context of a case where capturing means for capturing an object is implemented as the video cameras 2A to 2C, this embodiment is merely an example. A wide variety of image capturing devices capable of capturing an object, such as camera-equipped personal computers, web cameras, and camera-equipped portable phones. GPS via which position information is obtained may be designed to as to be integrated as a camera apparatus or to communicate with a camera via lines or wirelessly.

In the embodiment described above, position information constituting metadata is not limited to two-dimensional GPS information, i.e., the latitude and the longitude, but may be position information further including the altitude, as shown in FIG. 1.

In the embodiment described above, the recording medium 7 to be played back by the playback device 6 is a video tape. This embodiment is merely an example, and a wide variety of recording media other than video tapes, such as optical disks, magneto-optical disks, semiconductor memories, and magnetic disks, may be used.

A series of operations in the embodiment described above may be executed by hardware components having the individual functions or may be executed by software. When the series of operations is executed by software, a program constituting the software is installed from, for example, a recording medium to a computer incorporating the program constituting the software in specific hardware or a general-purpose personal computer capable of executing various functions by installing various programs.

In the embodiment described above, a program causing a computer to execute a first step of allocating a common address to the content data (audio-visual material) S1A to S1C obtained by capturing an object using the plurality of video cameras (capturing means) 2A to 2C and storing the content data (audio-visual material) S1A to S1C individually captured by the video cameras (capturing means) 2A to 2C according to the common address, and a second step of, when content data (audio-visual material) captured by a specified video camera (capturing means) is read, searching for the content data (audio-visual material) captured by the video cameras (capturing means) other than the specified video camera (capturing means) at the same time as the read content data (audio-visual material) is produced. This embodiment is merely an example, and a wide variety of computer-readable recording media recording this program may be used. The recording media may include optical disks, magneto-optical disks, semiconductor memories, and other packaged media.

In the embodiment described above, the video cameras (capturing means) 2A to 2C are grouped while maintaining the master-slave relation, and input means for inputting the content data (audio-visual material) S1A to S1C to which metadata (additional information) including address information for linking the video cameras (capturing means) 2A to 2C is added is implemented as the input unit 20 in the server 3. This embodiment is merely an example, and a wide variety of other input devices may be used.

In the embodiment described above, obtaining means for obtaining metadata (additional information) from the content data (audio-visual material) S1A to S1C input from the input unit (input means) 20 in the server 3 is implemented as the multiplexer/demultiplexer 22 in the server 3. This embodiment is merely an example, and a wide variety of other obtaining devices may be used.

In the embodiment described above, storing means for storing the content data (audio-visual material) S1A to S1C input from the input unit (input means) 20 in the server 3 and the metadata (additional information) corresponding to the content data (audio-visual material) S1A to S1C obtained by the multiplexer/demultiplexer (obtaining means) 22 based on the metadata (additional information) is implemented as the metadata storage unit 28. This embodiment is merely an example, and a wide variety of other storage devices may be used.

In the embodiment described above, searching means for automatically searching for the content data (audio-visual material) S1A to S1C to be linked to the content data (audio-visual material) S1A to S1C captured by a specified video camera (capturing means) when the content data (audio-visual material) S1A to S1C captured by the specified video camera (capturing means) is read from the storing means is implemented as the metadata processor 25 and the address processor 23 in the server 3. This embodiment is merely an example, and a wide variety of other searching devices may be used.

In the embodiment described above, output means for outputting the content data (audio-visual material) S1A to S1C searched for by the searching means implemented as the metadata processor 25 and the address processor 23 in the server 3 is implemented as the input unit 20 in the server 3. This embodiment is merely an example, and a wide variety of other output devices may be used.

In the embodiment described above, the metadata (additional information) to be added to the content data (audio-visual material) S1A to S1C includes time information and position information about capturing performed by the corresponding video cameras (capturing means) 2A to 2C, and the time information of the corresponding video cameras (capturing means) 2A to 2C match each other. Identifying means for identifying the relative positional relationship and the relative time relationship of the video cameras (capturing means) 2A to 2C corresponding to the content data (audio-visual material) S1A to S1C based on the metadata (additional information) obtained from the content data (audio-visual material) S1A to S1C by the multiplexer/demultiplexer (obtaining means) 22 is implemented as the metadata processor 25 in the server 3, and the metadata storage unit (storing means) 28 stores the relative positional relationship and the relative time relationship of the video cameras (capturing means) 2A to 2C identified by the metadata processor (identifying means) 25 so as to be added to the content data (audio-visual material) S1A to S1C captured by the video cameras (capturing means) 2A to 2C. This embodiment is merely an example, and a wide variety of other identifying devices and storage devices as long as the relative positional relation and the relative time relation of the video cameras (capturing means) 2A to 2C can be stored so as to be added to the content data (audio-visual material) S1A to S1C captured by the video cameras (capturing means) 2A to 2C.

In the embodiment described above, a display control apparatus for displaying the content data (audio-visual material) S1A to S1C obtained by capturing an object using the plurality of video cameras (capturing means) 2A to 2C is implemented as the display control apparatus 60 shown in FIG. 7. This embodiment is merely an example, and a wide variety of other display control apparatuses may be used.

In the display control apparatus 60 shown in FIG. 7, the video cameras (capturing means) 2A to 2C are grouped while maintaining the master-slave relation, and obtaining means for obtaining metadata (additional information) including address information for linking the video cameras (capturing means) 2A to 2C from the content data (audio-visual material) S1A to S1C to which the metadata (additional information) is added is implemented as the CPU 61. Display control means for displaying the content data (audio-visual material) S1A to S1C corresponding to the metadata (additional information) obtained by the CPU (obtaining means) 61 in a linked manner is implemented as the image processor 69 and the monitor 68. This embodiment is merely an example, and a wide variety of other obtaining devices and display control devices may be used as long as this display method can be realized.

In the display control apparatus 60 shown in FIG. 7, the metadata (additional information) to be added to the content data (audio-visual material) S1A to S1C includes time information and position information about capturing performed by the corresponding video cameras (capturing means) 2A to 2C. Identifying means for identifying the relative positional relationship and the relative time relationship of the video cameras (capturing means) 2A to 2C corresponding to the content data (audio-visual material) S1A to S1C based on the metadata (additional information) obtained from the content data (audio-visual material) S1A to S1C by the obtaining means is implemented as the CPU 61, and display control means formed of the image processor 69 and the monitor 68 selectively displays the content data (audio-visual material) S1A to S1C based on the relative positional relationship and the relative time relationship identified by the CPU (identifying means) 61. This embodiment is merely an example, and a wide variety of other identifying devices may be used as long as this display method can be realized.

The present invention is applicable to a wide variety of information processing apparatuses capable of storing various data, other than servers.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for processing content data obtained from a plurality of capturing means by capturing an object, the information processing apparatus including a server, comprising:

storing means for storing simultaneously with capturing, additional information in association with the content data, the additional information including address information for linking the content data obtained from grouped ones of the plurality of capturing means the additional information includes time information and position information about capturing performed by the grouped capturing means, the time information of the grouped capturing means matching each other;

obtaining means for obtaining and organizing the additional information stored by the storing means;

searching means for, when content data corresponding to specified capturing means in the plurality of capturing means is read from the storing means, automatically searching for the content data and the additional information to be linked to the read content data, and identifying means for identifying a relative positional relationship or a relative time relationship between the capturing means corresponding to the content data based on the additional information obtained by the obtaining means.

2. The information processing apparatus according to claim 1, wherein the address information is grouped address information in association with a relationship between the plurality of capturing means.

3. The information processing apparatus according to claim 2, wherein the relationship includes master-slave relation which is formed of one master and a plurality of slaves.

4. The information processing apparatus according to claim 1, wherein the storing means stores the relative positional relationship or the relative time relationship between the capturing means identified by the identifying means in association with the content data corresponding to the capturing means.

5. The information processing apparatus according to claim 1, further comprising converting means for converting a current position of each of the capturing means that is measured in each of the capturing means into a relative position with respect to specified capturing means in the plurality of capturing means or the object.

6. An information processing method for processing content data obtained from a plurality of capturing means by capturing an object, the information processing method comprising the steps of:

storing in a server simultaneously with capturing an object additional information in association with the content data, the additional information including address information for linking the content data obtained from grouped ones of the plurality of capturing means the additional information includes time information and position information about capturing performed by the grouped capturing means, the time information of the grouped capturing means matching each other;

obtaining and organizing within the server the additional information stored by the step of storing;

when content data corresponding to specified capturing means in the plurality of capturing means is read, automatically searching within the server for the content data and the additional information to be linked to the read content data, and identifying a relative positional relationship or a relative time relationship between the capturing means corresponding to the content data based on the additional information obtained by the obtaining step.

7. A recording medium recording a program causing a computer to execute an information process for processing content data obtained from a plurality of capturing means by capturing an object, the information process comprising the steps of:

storing in a server simultaneously with capturing an object additional information in association with the content data, the additional information including address information for linking the content data obtained from grouped ones of the plurality of capturing means the additional information includes time information and position information about capturing performed by the grouped capturing means, the time information of the grouped capturing means matching each other;

obtaining and organizing within the server the additional information stored by the step of storing;

when content data corresponding to specified capturing means in the plurality of capturing means is read, automatically searching within the server for the content data and the additional information to be linked to the read content data, and identifying a relative positional relationship or a relative time relationship between the capturing means corresponding to the content data based on the additional information obtained by the obtaining step.

8. An information processing apparatus for processing content data obtained from a plurality of capturing means by capturing an object, the information processing apparatus including a server, comprising:

obtaining means for obtaining and organizing additional information including address information for linking the content data obtained from grouped ones of the capturing means the additional information to be added to the content data includes time information and position information about capturing performed by the capturing means;

searching means for, when content data corresponding to specified capturing means in the plurality of capturing means is specified, automatically searching for the content data and the additional information to be linked to the specified content data based on the additional information obtained by the obtaining means;

display control means for displaying the content data in a linked manner using the additional information obtained by the obtaining means and the content data searched for by the searching means, and identifying means for identifying a relative positional relationship and a relative time relationship between the capturing means corresponding to the content data based on the additional information obtained from the content data by the obtaining means.

9. The information processing apparatus according to claim 8, wherein the display control means displays the content data based on the relative positional relationship and the relative time relationship identified by the identifying means.

10. An information processing method utilizing a recording medium within a server recording a program causing a computer to execute an information process for processing content data obtained from a plurality of capturing means by capturing an object, the information processing method comprising the steps of:

storing simultaneously with capturing, additional information in association with the content data, the additional information including address information for linking the content data obtained from grouped ones of the plurality of capturing means the additional information includes time information and position information about capturing performed by the grouped capturing means, the time information of the grouped capturing means matching each other;

obtaining and organizing the additional information stored by the step of storing;

when content data corresponding to specified capturing means in the plurality of capturing means is read, automatically searching for the content data and the additional information to be linked to the read content data, and identifying a relative positional relationship or a relative time relationship between the capturing means corresponding to the content data based on the additional information obtained by the obtaining step.

11. An information processing method for processing content data obtained from a plurality of capturing means by capturing an object, the information processing method comprising the steps of:

obtaining and organizing within a server additional information including address information for linking the content data obtained from the captured object the additional information includes time information and position information about capturing performed by the grouped capturing means, the time information of the grouped capturing means matching each other;

when content data corresponding to specified capturing means in the plurality of capturing means is specified, automatically searching within the server for the content data and the additional information to be linked to the specified content data based on the additional information obtained during the obtaining step;

displaying the content data in a linked manner using the additional information obtained during the obtaining step and the content data searched for, and identifying a relative positional relationship or a relative time relationship between the capturing means corresponding to the content data based on the additional information obtained by the obtaining step.

12. An information processing apparatus for processing content data obtained from a plurality of capturing devices by capturing an object, the information processing apparatus including a server, comprising:

a storing device configured to store simultaneously with capturing additional information in association with the content data, the additional information including address information for linking the content data obtained from grouped ones of the plurality of capturing devices;

an obtaining device configured to obtain and organize the additional information stored by the storing device;

a searching device, when content data corresponding to specified capturing device in the plurality of capturing devices is read from the storing device, configured to automatically search for the content data and the additional information to be linked to the read content data, wherein the additional information includes time information and position information about capturing performed by the grouped capturing devices, the time information of the grouped capturing devices matching each other, and the information processing apparatus further comprises an identifying device configured to identify a relative positional relationship or a relative time relationship between the capturing devices corresponding to the content data based on the additional information obtained by the obtaining device.

13. The information processing apparatus according to claim 12, wherein the address information is grouped address information in association with a relationship between the plurality of capturing devices.

14. The information processing apparatus according to claim 13, wherein the relationship includes master-slave relation which is formed of one master and a plurality of slaves.

15. The information processing apparatus according to claim 12, wherein the storing device stores the relative positional relationship or the relative time relationship between the capturing devices identified by the identifying device in association with the content data corresponding to the capturing devices.

16. The information processing apparatus according to claim 12, further comprising a converting device configured to convert a current position of each of the capturing devices that is measured in each of the capturing devices into a relative position with respect to specified capturing devices in the plurality of capturing devices or the object.

17. An information processing apparatus for processing content data obtained from a plurality of capturing devices by capturing an object, the information processing apparatus including a server, comprising:

an obtaining device configured to obtain and organize additional information including address information for linking the content data obtained from grouped ones of the capturing devices, the additional information to be added to the content data includes time information and position information about capturing performed by the capturing devices;

a searching device when content data corresponding to specified capturing devices in the plurality of capturing devices is specified, configured to automatically search for the content data and the additional information to be linked to the specified content data based on the additional information obtained by the obtaining device;

a display control device configured to display the content data in a linked manner using the additional information obtained by the obtaining device and the content data searched for by the searching device, and an identifying device configured to identify a relative positional relationship and a relative time relationship between the capturing devices corresponding to the content data based on the additional information obtained from the content data by the obtaining device.

18. The information processing apparatus according to claim 17, wherein the display control device displays the content data based on the relative positional relationship and the relative time relationship identified by the identifying device.

* * * * *